Figure 1:
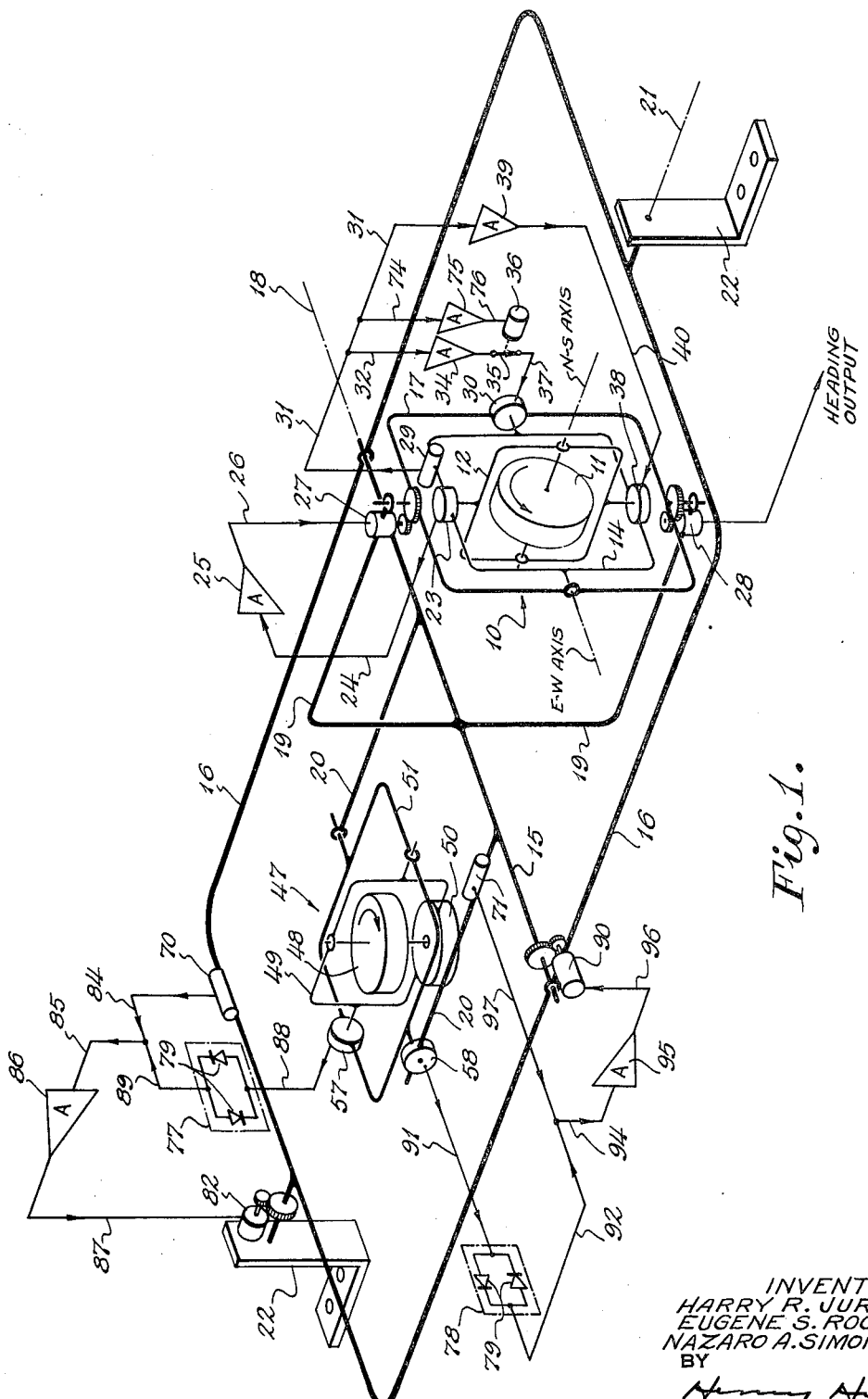

INVENTORS
HARRY R. JURMAN
EUGENE S. ROCKS
NAZARO A. SIMONELLI
BY
ATTORNEY

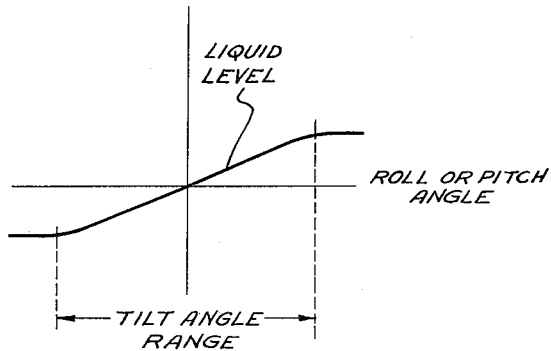
Fig. 3. ELECTROLYTIC LEVEL SIGNAL OUTPUT
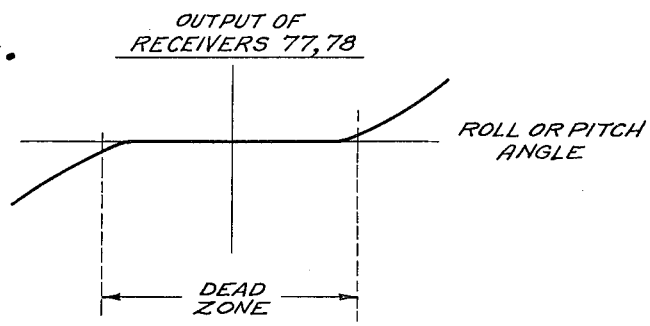
Fig. 4. OUTPUT OF RECEIVERS 77, 78
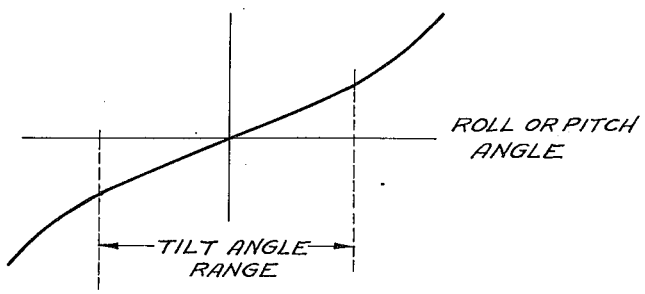
Fig. 5. RESULTANT INPUT TO LOOP MOTORS United States Patent Office 3,220,266
Patented Nov. 30, 1965

3,220,266
COMPASS STABILIZING SYSTEM
Harry R. Jurman, Huntington, Eugene S. Rocks, Commack, and Nazaro A. Simonelli, New Hyde Park, N.Y., assignors to Sperry Rand Corporation, Great Neck, N.Y., a corporation of Delaware
Filed Sept. 3, 1959, Ser. No. 837,877
13 Claims. (Cl. 74—5.34)

This invention relates to a stabilizing system for compasses of the gyroscopic type where the base or binnacle of the compass is fixed to a mobile body such as an aircraft that is completely maneuverable about pitch, roll and azimuth axes. In the improved system, the directed gyroscopic element of the compass is stabilized through the operation of a servo loop with a primary input provided by a gravity reference and a secondary input provided by a vertical reference such as a gyro vertical. Under straight and level flight conditions or non-maneuvering operations of the system, the output of the gravity reference to the loop stabilizes the directed element of the compass about a vertical axis with close accuracy to prevent errors from occurring in the compass. During maneuvering conditions of operation of the system in which the craft moves partially or completely about one or more of its axes, the secondary input to the loop from the gyroscopic vertical reference becomes effective to maintain the vertical axis of the directed compass element erected to a substantially true rather than an apparent vertical regardless of the changing attitude of the craft or movement of the base about the directed element of the compass. The means for directing the gyroscopic element of the compass may be disabled under maneuvering conditions of operation of the improved stabilizing system.

An object of the invention is to provide a full freedom compass of the character specified that is capable of performing satisfactorily in a completely maneuverable craft.

One of the features of the invention resides in the inclusion in the stabilizing servo loop of the system of two vertical references one of which is non-gyroscopic such as a gravity responsive means or electrolytic level and the other of which is gyroscopic and includes an erected gyroscopic element.

Another feature of the invention is provided by the relation established in the system between the gravity and gyroscopic references, the gravity reference being solely effective to stabilize the compass during non-maneuvering conditions of craft operation and the gyroscopic reference being effective during maneuvering flight conditions of the craft to stabilize the compass and make it independent of the movements of the craft about its axes.

A further feature of the invention resides in the provision of means for disabling the directing means of the compass during maneuvering conditions of operation of the system.

Figure 2:
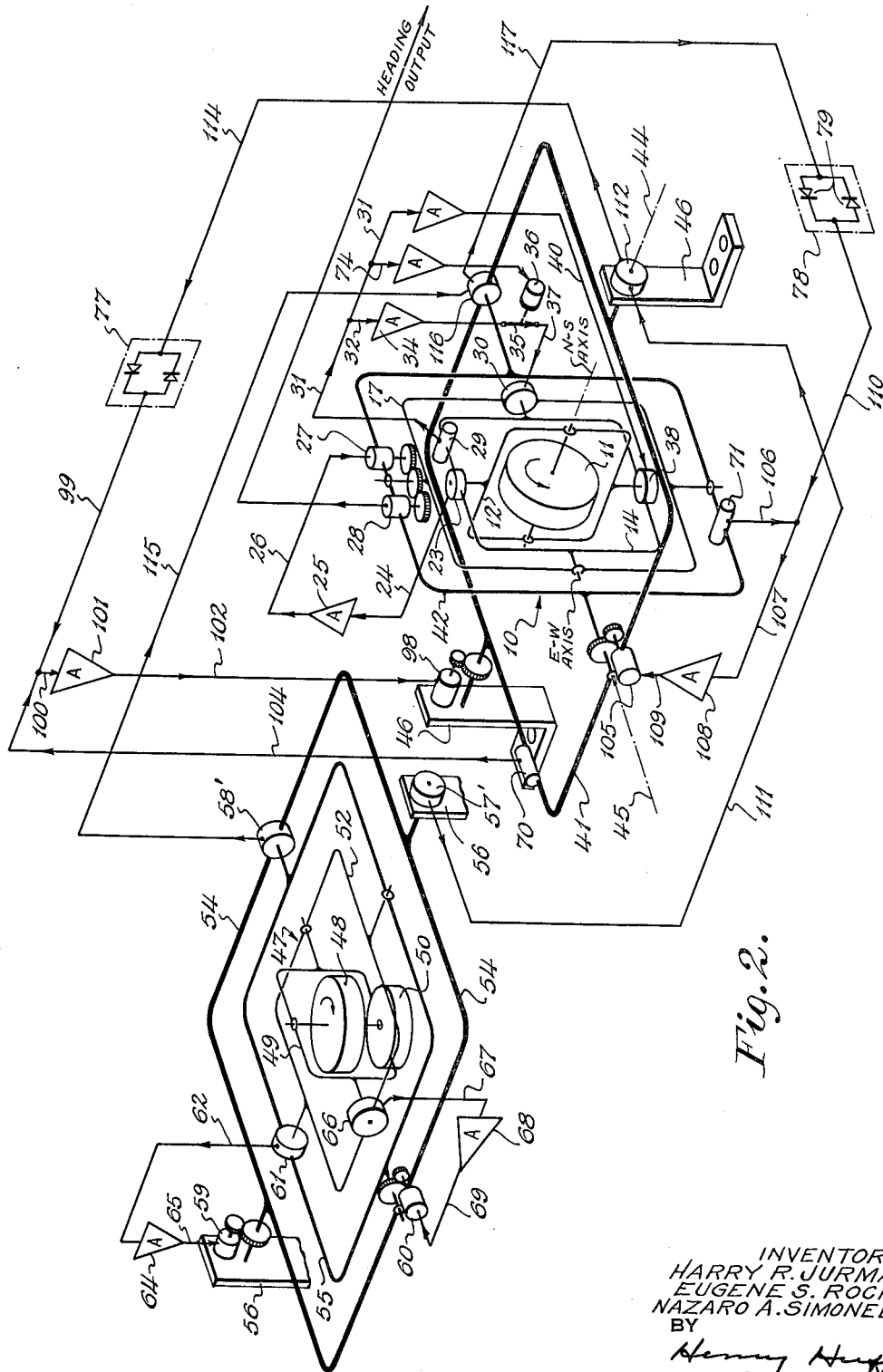

Other objects, features and structural details of the invention will be apparent from the following description when read in relation to the accompanying drawings, wherein:

FIG. 1 is a perspective schematic view and circuit diagram showing an embodiment of the improved stabilizing system in which the compass and gyroscopic reference are supported on common gimbals, FIG. 2 is a view similar to FIG. 1 of a modification of the system in which the gyroscopic reference is located in remote relation on the craft apart from the gyroscopic compass, FIG. 3 is a graph showing the signal output of the gravity reference or electrolytic level of the system with respect to a predetermined tilt angle range from a level condition.

FIG. 4 is a view similar to FIG. 3 showing the input to one of the motors of the stabilizing loop from the signal means controlled by the gyroscopic reference, FIG. 5 is a further graph showing the resultant output to the motor of the loop with respect to a predetermined tilt angle range as provided from both the gravity reference and the gyroscopic reference.

In FIGS. 1 and 2 of the drawing, the illustrative compass shown therein is generally indicated at 10. The compass per se is of the basic gyro compass type shown in FIG. 2 of U.S. Letters Patent No. 2,729,107, issued January 3, 1956, to F. D. Braddon in which the directed element includes a gyroscopic rotor 11 that is controlled to spin about a normally horizontal axis that is directed north-south. The rotor 11 is mounted to spin about a horizontal axis in a vertical ring or case 12 that in turn is supported in a ring 14 having freedom about a horizontal, east-west axis. The rotor 11 of the combination is spun by suitable means (not shown) about its north-south directed axis.

In the embodiment of the invention shown in FIG. 1, the ring 14 is furthermore mounted on the craft by a pair of mutually perpendicular gimbals or supports 15 and 16, and a follow-up vertical ring 17. Gimbal 15 has freedom about an axis 18, that may correspond or be parallel to the pitch axis of the craft and includes, in FIG. 1, connected integral open-ended extensions having vertically disposed spaced arms 19 and horizontally disposed spaced arms 20. The follow-up ring 17 of the compass is supported with freedom about a vertical axis between the spaced arms 19 of the gimbal supporting member 15. Gimbal 16 of the structure supports the gimbal 15 with freedom about the axis 18 and itself in turn is suitably mounted on the craft through suitable means providing freedom about an axis 21 that may correspond or be parallel to the roll axis of the craft. Gimbal 16 is connected to the craft through suitable bearing means including a pair of fixed spaced brackets that are secured to the craft by suitable fastening means. The axes of the gimbals or supports 15 and 16 are mutually perpendicular and substantially level during non-maneuvering as well as maneuvering conditions of flight.

The horizontal axis of the ring 14 of the compass is maintained in an east-west direction by conventional means including an electric pick-off indicated at 23 with a stator part fixed to ring 14 and a rotor part fixed to the ring or case 12. Pick-off 23 senses displacement of the ring 14 from a perpendicular relation with respect to the axis of the ring 12 and provides a signal output that by way of lead 24, amplifier 25 and lead 26 to motor 27 drives the ring 17 to maintain the correct orientation of the elements. Motor 27 is carried by the upper arm 19 of the supporting gimbal 15 and is connected to move the follow-up ring 17 about its axis through suitable gearing. In this form of the invention, the heading output of the gyro compass is obtained from a suitable electrical transmitter or pick-off 28 with a stator part carried by the lower arm 19 of the gimbal 15 and a rotor part operatively connected to the ring 17 through suitable gearing.

In both FIGS. 1 and 2, the means for directing the gyroscopic element of the compass with its spin axis pointing north-south is provided by an east-west tilt sensing device such an electrolytic level 29 that is mounted on the ring 14. A suitable torque motor 30 carried by the ring 17 exerts a torque about the east-west axis of the compass in accordance with the signal output of the level 29 to obtain this result. As shown, the output of the level 29 is fed the torque motor 30 by way of lead 31, lead 32, amplifier 34, the normally closed armature 35 of a relay 36 and lead 37. The means for damping or levelling the gyroscopic element of the compass about its east-west axis includes a torque motor 38 carried by the ring 14 that exerts a torque about the axis of the case 12. Motor 38 is controlled in accordance with the signal output of the level 29 fed thereto by way of lead 31, amplifier 39 and lead 40.

In the embodiment of the invention shown in FIG. 2, the gimbals or supports providing full freedom between the craft and compass are indicated at 41 and 42. The interconnected gimbals 41 and 42 are arranged in the craft with mutually perpendicular and normally horizontal axes 44 and 45 in similar relation to the corresponding gimbals 16 and 15. As shown, the gimbal 41 is mounted on the craft through spaced brackets 46 with freedom about the axis 44. Gimbal 42 is mounted with freedom about axis 45 on the gimbal 41. The follow-up ring 17 of the compass is mounted in this instance on the gimbal 42 with freedom about a normally vertical axis. In this structure, both the driving motor 27 for the follow-up ring 17 and the heading output transmitter 28 of the compass are located on the gimbal 42 and are operatively connected to the ring 17 through suitable gearing. The gimbals provide a universal support between the directed compass element and the base of the compass or the craft.

As shown in FIGS. 1 and 2, the improved system further includes a known vertical reference such as a gyro vertical indicated generally at 47. In the embodiment of the invention shown in FIG. 1, the gimbals 15 and 16 also support the gyroscopic element of the gyro vertical. The vertical reference shown includes a gyroscopic rotor 48 supported on a ring or case 49 to spin about a substantially vertical axis. The rotor 48 is spun about its axis by suitable motive means that are not shown. Gyroscopic element 49 is erected about mutually perpendicular, normally horizontal axes corresponding to the gimbal axes 21 and 18 by an erecting means indicated generally at 50 that may be of the type shown and described in U.S. Letters Patent No. 2,603,095, issued July 15, 1952 to C. E. Barkalow. In the structure shown in FIG. 1, the ring 49 is supported between the arms 20 of the gimbal 15 by a further gimbal 51. Where the gyro vertical 47 is remotely located on the craft to the compass as shown in FIG. 2, the gyro vertical gimbal 52 for the ring or case 49 is supported on the craft by a second pair of gimbals indicated at 54 and 55 whose respective axes correspond to the compass support axes 44 and 45 of the respective gimbals 41 and 42. As shown, gimbal 54 is connected to the base or craft through suitable bearing means and the spaced brackets 56. Gimbal 55 is carried by the gimbal 54 with freedom about an axis parallel to axis 45. Also, the gimbal 52 is carried by the gimbal 55 with freedom about an axis shown in FIG. 2 to be coincident to the axis 44 of the compass supporting gimbal 41. The gyroscopic reference signal means provided in FIG. 1 include conventional electrical pick-offs 57 and 58 located at the respective axes of the gyro vertical that provide an output in accordance with relative tilt about the gimbal axes between the element 49 and gimbal 51, and gimbal 51 or element 49 and the gimbal arm 20 of gimbal 15. Similar pick-offs for the remote gyro vertical are indicated at 57' and 58' in FIG. 2, the pick-off 57' being between the bracket 56 and gimbal 54 and the pick-off 58' being between the gimbal 54 and gimbal 55. The gimbals 54 and 55 of the remote gyro vertical are maintained in substantially level condition by a pair of closed servo loops, one of which includes a motor 59 operatively connected to the gimbal 54 and the other of which includes a motor 60 carried by the gimbal 54 and operatively connected to gimbal 55. In the arrangement shown in FIG. 2, an additional pick-off 61 between ring 55 and ring 52 provides a controlling output signal to the motor 59 by way of lead 62, amplifier 64 and lead 65 which moves the gimbal 54 to null the signal of the pick-off 61 and close the loop. Pick-off 66 of the arrangement between ring 49 and ring 52 controls the second servo loop in a similar manner, the signal of the pick-off 66 being fed the motor 60 by way of lead 67, amplifier 68 and lead 69. Motor 60 is accordingly operative to move the gimbal 55 about its axis to null the signal of the pick-off 66.

In accordance with the invention, the system includes a gravity reference such as electrolytic levels of the type shown in FIG. 3 of the heretofore identified letters patent to Braddon as generally indicated at 70 and 71 in both FIGS. 1 and 2. The levels are constructed to provide a limited signal output linearly proportional to tilt of the gimbals from a level condition about the respective axes 21, 18, 44 and 45, to a predetermined angle such as one degree beyond which no further increase in signal occurs as clearly shown by the curve in FIG. 3. In this figure, the designated tilt angle range of the levels are accordingly between approximately plus and minus one degree from a horizontal or null condition at which the levels produce no further output. The level 70 in FIG. 1 is carried by the gimbal 16 to sense tilt thereof from a level condition about axis 21. The level 71 in FIG. 1 is carried by the gimbal 15 on one of the arms 20 to sense tilt thereof from a level condition with respect to axis 18. The corresponding levels in FIG. 2 are carried by the respective gimbals 41 and 42 to sense tilt about the axes 44 and 45. When unaffected by horizontal accelerations, the levels 70, 71 during non-maneuvering conditions, control the system to stabilize the gyroscopic element 12 of the compass with close accuracy vertically. Inaccurate stabilization of the element 12 causes erroneous rotation of the compass level 29 about its own sensitive axis that introduces errors into the compass output.

In order to maintain the accuracy of the compass when subject to acceleration as during maneuvering flight conditions, the system includes normally ineffective means for disabling the directing means of the compass and means for rendering the disabling means effective during maneuvering flight conditions. The first of these means is provided in FIGS. 1 and 2 by the relay 36 whose armature 35 normally closes the circuit connecting the amplifier 34 and torque motor 30. The level 29, connecting leads 74 and 31, and amplifier 75 constitute the means for rendering the disabling means effective during maneuvering flight conditions. When the signal of the lever 29 is below a predetermined magnitude in the range normally encountered in compass operation, the disabling means is ineffective. The relay 36 responds to the signal of the level at a predetermined cut-off magnitude to actuate the armature 35 and open the input circuit to the torque motor 30. There is accordingly no error build-up in the compass due to the effect of acceleration either on the tilt sensing devices of the system or compass during maneuvering flight conditions.

The gyro vertical included in the system stabilizes the gyroscopic element 12 of the compass to a substantially true rather than an apparent vertical during maneuvering flight where the signal outputs of the gravity responsive means or levels 70, 71 are in error due to the influence of acceleration. In accordance with the invention, the stabilization provided the system by the gyro vertical is maintained ineffective until the effective tilt of the gimbals or supports exceeds the predetermined tilt angle range heretofore noted. The improved system accordingly includes a means providing an output from the gyro vertical only when the relative tilt of the gimbals from a level condition about either of their respective axes exceeds a predetermined pitch or roll angle as shown in FIG. 4 and substantially corresponding to the range indicated in FIG. 3. This means is provided in the present showing by the reference and the pick-offs 57, 57' and 58, 58' whose signals are fed to suitable diode receivers 77, 78 that null the signals in an indicated dead zone shown in FIG. 4 of the approximate dimensions of the tilt angle range. The output of the receivers 77, 78 to the system is clearly shown in FIG. 4 in the curve to the respective sides of an indicated dead zone along the dimension of the graph representing roll or pitch angle. As shown in FIGS. 1 and 2, the indicated receiver 77 may include a pair of silicon rectifiers 79 with characteristics such that the output voltage is nulled over a range substantially corresponding to the dead zone angle designated in FIG. 4. The resultant output represented in the curve shown in FIG. 5 for both the level and reference pick-off, for one gimbal axis, combines the individual outputs shown in FIGS. 3 and 4. Accordingly, the system is responsive to the gravity responsive means or levels 70, 71 during non-maneuvering or straight and level flight conditions in the tilt range of the gyro vertical below the pick-off output level and is responsive to the outputs of the receivers 77, 78 during maneuvering flight conditions as well as the outputs of the respective gravity responsive means in the tilt range of the gyro vertical above the pick-off output level. The primary output provided by the gravity responsive means or levels 70, 71 is in accordance with effective tilt of the gimbals from a level condition through a tilt range that substantially corresponds to the predetermined null output tilt range of the secondary signal means.

In the improved system shown in FIG. 1, the gimbal or support 16, the gyroscopic reference 47, level 70, pick-off 57 and receiver 77 are portions of a closed stabilizing servo loop that includes a motor 82 located on bracket 22 and operatively connected to the gimbal 16 through suitable gearing. The motor 82 is operated by the signal output of the level 70 by way of lead 84, lead 85, amplifier 86 and lead 87. The output of the pick-off 57 fed the receiver 77 by way of lead 88 is connected to the motor by way of lead 89 from the receiver 77 to the input lead 85 to the amplifier 86. Operation of the loop maintains the gimbal 16 level with respect to its axis 21 and accordingly provides one of the axes of stabilization for the compass. The second gimbal 15 of the system shown in FIG. 1 is controlled in a similar manner to provide stabilization of the compass with respect to axis 18. The motor 90, in this instance, is carried by the gimbal 16 and is operatively connected to the gimbal 15 through suitable gearing. The second loop operates to null the outputs of the gravity responsive means 71 and the reference pick-off 58. As shown, pick-off 58 is connected to the receiver 78 by way of lead 91. The receiver 78 is connected to the motor 90 by way of lead 92, lead 94, amplifier 95 and lead 96. The level 71 is connected to the input lead 94 to the amplifier 95 by the lead 97. In the operation of the system, the pair of gimbals 15, 16 maintain a fixed relation to the axes 18 and 21 and accordingly provide a level plane for the stabilization of the compass that is independent of the craft. In non-maneuvering or straight and level flight, the system is solely responsive to the outputs of the electrolytic levels 70, 71 through a tilt angle that substantially corresponds to the dead zone tilt angle provided for the gyroscopic reference 47 to provide the accurate stabilization necessary for the compass to operate correctly in an aircraft. The gyroscopic reference component 47 of the system is effective for tilt of the gimbals about the respective axes exceeding the predetermined tilt angle or when the levels 70, 71 provide an equivalent error output due to the effect thereon of acceleration such as would occur during maneuvering flight conditions. Beyond the range of the levels, as shown in FIG. 5, the system includes the stabilizing outputs of the receivers 77, 78 connected to the gyroscopic reference pick-offs 57, 58. During maneuvering conditions of operation of the system, the compass is automatically disabled as heretofore described.

In the embodiment of the invention shown in FIG. 2, the motor 98 of one of the servo loops is connected to the ring 41 through suitable gearing. The receiver 77 for the signal of the remote gyroscopic reference 47 is connected to the motor 98 by way of lead 99, lead 100, amplifier 101 and lead 102. Receiver 77 is fed the signal from pick-off 57' by way of lead 111, a similar pick-off 112 sensing tilt between the gimbal 41 and bracket 46 and lead 114. The electrolytic level input to motor 98 is provided in this instance by a connecting lead 104 between the level 70 and the amplifier input lead 100. The second loop electrolytic level input for controlling the gimbal 42, as shown in FIG. 2, is fed to the motor 105 by way of lead 106, lead 107, amplifier 108 and lead 109. The gyroscopic reference input to the motor 105 is obtained from receiver 78 by way of lead 110 to the amplifier input lead 107. The receiver 78, in this instance, is fed the signal from pick-off 58' by way of lead 115, a similar pick-off 116 sensing tilt between the gimbals 41 and 42 and lead 117. In this form of the invention, the gyroscopic reference 47 is located apart from the compass on the craft and the reference is provided with a second pair of gimbals 54 and 55 controlled by respective closed follow-up loops including related motor 59 and pick-off 61, and motor 60 and pick-off 66. The gimbals 54, 55 are accordingly maintained level during craft maneuvering conditions and the gyroscopic reference is free of gimbal lock. The function of the remote gyroscopic reference 47 in the improved compass stabilizing system is the same as that heretofore described for the gyro vertical 47 shown in FIG. 1.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A compass stabilizing system for maneuverable craft including a compass having a directed gyroscopic element; a gyro vertical having mutually perpendicular, normally horizontal axes; first means providing an output only when the relative tilt of the gyro vertical from a level condition about one of its axes exceeds a predetermined angle including a pick-off connected to the gyro vertical; second means providing an output only when the relative tilt of the gyro vertical from a level condition about the other of its axes exceeds a predetermined angle including a pick-off connected to the gyro vertical; a pair of gimbals universally supporting the directed compass element with relation to the craft, one of the gimbals having an axis corresponding to one of the axes of the gyro vertical and the other of the gimbals having an axis corresponding to the other of the axes of the gyro vertical; first gravity responsive means carried by one of the gimbals providing an output in accordance with effective tilt of the gimbals from a level condition through a tilt range to a tilt angle substantially corresponding to the predetermined tilt angle of the gyro vertical about the one of its axes; second gravity responsive means carried by the other of the gimbals providing an output in accordance with effective tilt of the gimbals from a level condition through a tilt range to a tilt angle substantially corresponding to the predetermined tilt angle of the gyro vertical about the other of its axes; a first stabilizing servo loop including a motor operatively connected to the one gimbal responsive to the output of the first gravity responsive means in the tilt range of the gyro vertical below the first pick-off output level and responsive to the outputs of the first gravity responsive means and the first output providing means in the tilt range of the gyro vertical above the first pick-off output level; and a second stabilizing servo loop including a motor operatively connected to the other gimbal responsive to the output of the related gravity responsive means in the tilt range of the gyro vertical below the second pick-off output level and responsive to the outputs of the second gravity responsive means and the second output providing means in the tilt range of the gyro vertical above the second pick-off output level.

2. A system of the character claimed in claim 1, in which said gyro vertical is directly mounted on one of the pair of gimbals with one of its axes coincident to the axis of one of the gimbals and the other of its axes parallel to the axis of the other gimbal.

3. A system of the character claimed in claim 1, including means for independently stabilizing said gyro vertical with relation to the craft apart from said compass and said compass supporting gimbals.

4. A system of the character claimed in claim 1, including means for directing the gyroscopic element of the compass about a normally vertical axis including an electrolytic level having an output means for disabling said directing means, and means responsive to the output of said level at a predetermined magnitude for operating said disabling means.

5. In a system of the character described: a compass having a directed gyroscopic element; a vertical gyroscope having an erected gyroscopic element with normally horizontal, mutually perpendicular axes; means controlled by said vertical gyroscope providing a signal only when the relative tilt of the vertical gyroscope from a horizontal condition about one of its axes exceeds a predetermined angle; a gimbal supporting the directed element of the compass with freedom about an axis corresponding to the one axis of the vertical gyroscope; gravity sensing means carried by the gimbal providing a signal in accordance with the effective tilt of the gimbal from a horizontal condition about its axis through a tilt range substantially corresponding to the predetermined angle of said vertical gyroscope signal means; and a servo loop including a motor connected to operate said gimbal to stabilize the compass responsive to the signal of said gravity sensing means in the tilt range of the vertical gyroscope below the predetermined tilt angle and responsive to the signal of the gravity sensing means and the signal of the vertical gyroscope signal means in the tilt range of the vertical gyroscope above the predetermined tilt angle.

6. The combination claimed in claim 5, in which said vertical gyroscope signal means includes an electrical pick-off providing a signal in accordance with tilt about the axis from a horizontal condition, and a diode receiver for the pick-off signal operating to null the signal through a tilt range corresponding to the predetermined tilt angle of the vertical gyroscope.

7. The combination claimed in claim 5, in which said gravity sensing means is an electrolytic level providing a limited electrical signal input to the motor in the tilt range of the vertical gyroscope above the predetermined tilt angle.

8. In a compass stabilizing system: a compass having a directed gyroscopic element; a gyro vertical having an erected gyroscopic element mounted with freedom about two mutually perpendicular, normally horizontal axes; a support for the directed gyroscopic element having an axis corresponding to one of the axes of the gyro vertical; means providing a signal in accordance with the effective tilt of the support about its axis that reaches a limit at a predetermined angle from a level condition; means controlled by said gyro vertical for providing a signal in accordance with tilt about its corresponding axis exceeding the predetermined angle at which the support tilt signal means limits; and a stabilizing servo loop including a motor connected to move the support about its axis in accordance with the signal of said support tilt signal means during non-maneuvering conditions of operation of the system and in accordance with the limited signal of said support tilt signal means and the signal of said gyro vertical signal means during maneuvering conditions of operation of the system.

9. A system as claimed in claim 8, in which said gyro vertical signal means includes an electrical pick-off and a diode receiver for the pick-off that nulls the signal of the gyro vertical signal means through a tilt range below the predetermined angle at which the support tilt signal means limits.

10. A system as claimed in claim 8, including a second support for the directed gyroscopic element having an axis corresponding to the other of the axes of the gyro vertical; a second means providing a signal in accordance with the effective tilt of the second support about its axis that reaches a limit at a predetermined angle from a level condition; second means controlled by said gyro vertical for providing a signal in accordance with tilt about its other axis exceeding the predetermined angle at which the second support tilt signal means limits; and a second stabilizing servo loop including a motor connected to move the second support about its axis in accordance with the signal of said second support tilt signal means during non-maneuvering conditions of operation of the system and in accordance with the limited signal of said second support tilt signal means and the signal of said second gyro vertical signal means during maneuvering conditions of operation of the system.

11. A system as claimed in claim 8, including means for directing the gyroscopic element of the compass about a normally vertical axis; means for leveling the gyroscopic element of the compass about a normally horizontal axis; an electrolytic level providing an output signal in accordance with tilt of the compass element about its horizontal axis; and means responsive to the signal of said level at a predetermined magnitude operable to disable said directing means.

12. In a compass stabilizing system for maneuverable craft, a compass having a gyroscopic compass element mounted on the craft with freedom about a normally vertical axis and a normally horizontal axis, means for directing the gyroscopic compass element about its vertical axis, means for stabilizing the gyroscopic compass element about its horizontal axis including a gimbal supporting the element mounted on the craft with freedom about a normally horizontal axis, a servo loop having a stabilizing motor for moving the gimbal about its axis in relation to the craft, and means for operating said motor including a gravity reference providing a limited primary input to the motor through a predetermined range of tilt of the gimbal from a level condition about its axis, and a gyro vertical carried by the craft with an axis corresponding to the axis of the gimbal providing a secondary input to the motor supplementing the limited primary input with tilt of the gimbal about its axis above the predetermined tilt range of the gravity reference.

13. A system of the character claimed in claim 12, in which the means for directing the gyroscopic compass element includes an electrolytic level having an output depending on the tilt of the element about its horizontal axis, means for disabling said directing means, and means responsive to the output of said electrolytic level at a predetermined magnitude for operating said disabling means.

References Cited by the Examiner

UNITED STATES PATENTS

| | | | |
|---|---|---|---|
| 2,586,469 | 2/1952 | Kuyenhoven. | |
| 2,685,207 | 8/1954 | Barkalow et al. | |
| 2,729,107 | 1/1956 | Braddon | 74—5.34 |
| 2,756,598 | 7/1956 | Hammond. | |
| 2,821,087 | 1/1958 | Hammon | 74—5.41 |

DON A. WAITE, *Primary Examiner.*